Feb. 4, 1947. A. DIERICHS 2,415,087
RECOVERY OF EXTRACTION AGENTS FOR PHENOLIC COMPOUNDS
Filed March 11, 1941
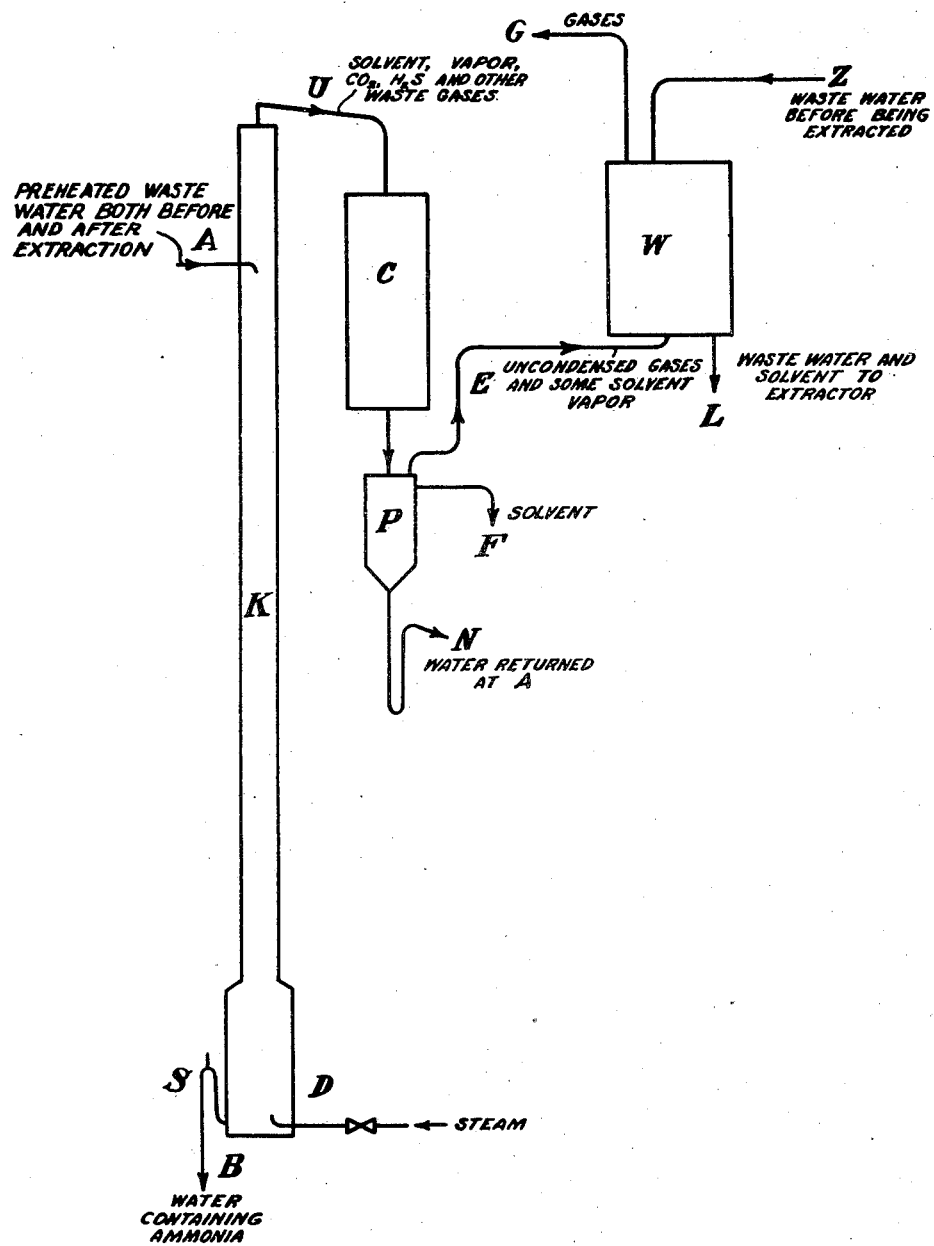
Inventor
ALFRED DIERICHS
By [signature]
Attorney.

Patented Feb. 4, 1947

2,415,087

UNITED STATES PATENT OFFICE 2,415,087

RECOVERY OF EXTRACTION AGENTS FOR PHENOLIC COMPOUNDS

Alfred Dierichs, Leverkusen-Wiesdorf, Germany; vested in the Alien Property Custodian Application March 11, 1941, Serial No. 382,694
In Germany February 19, 1940

5 Claims. (Cl. 202—40)

Waste waters containing phenolic compounds, especially gas liquors of coke ovens, low temperature carbonization plants, hydrogenation plants and in general of all operations in which pitcoal or lignite etc. are partly or completely gasified, may be freed from the phenols by extraction with solvents as for instance acetic acid ethylester, acetic acid butylester, methylethylketone, diisopropylketone, methylbutylketone, dibutylketone or mixtures, if necessary, in mixture with other organic compounds containing oxygen, sulfur or nitrogen. It is to be pointed out, that the present invention can be realized also when other solvents not mentioned are used provided that they are volatile with water vapors.

As extraction solvents or agents of this kind show a certain solubility in water, the extracted waste waters are saturated with them in the proportion of their solubility in water. Apart from that the extracted waste waters, especially from low temperature carbonization plants etc., further contain other dissolved compounds, such as carbon dioxide, hydrogen sulfide and ammonia. When an economical working is desired, it is necessary to recover the extraction agents remaining dissolved in the extracted waste waters. This recovery may be accomplished by vaporizing a small part of the extracted water in a distilling vessel and condensing the vapor which passes over. A condensate is obtained which consists of the extraction agent employed and water. When working in this way the dissolved gases, such as carbon dioxide and hydrogen sulfide besides the ammonia are set free. This causes the formation of solid bicarbonate of ammonia in the condenser which leads to difficulties during the operation.

The object of this invention is to provide a new process of recovering extraction agents dissolved in waste water that also contains carbon dioxide and ammonia which is free from the objection stated above. According to this invention the extracted waste waters are rectified in such a way that the total quantity of the water is introduced in the upper part of the rectifying column. By this working only carbon dioxide and hydrogen sulfide—eventually with other inert gases such as nitrogen—are set free, while almost the total quantity of the ammonia remains dissolved in the water which flows down in the column. Besides an azeotropic mixture of water and extraction agent distills over.

An especially advantageous procedure consists in preheating the extracted waste waters. This preheating secures an especially complete degassing and removal of carbon dioxide and hydrogen sulfide. It is preferred to preheat the water to a temperature which is 5 to 20° C. below the temperature maintained in the distilling vessel.

The vapors which escape from the column and consist mainly of vapors of extraction agents, water vapors, carbon dioxide and hydrogen sulfide, are conveyed to a condenser. Extraction agent and water are condensed while the non-condensable gases leave the column. The escaping gases carry away a certain part of the extraction agent in gaseous form. This portion might be recovered for instance by passing the gases over activated carbon in known manner.

It is a further object of the present invention to provide a very simple and economical process for recovering also this portion of extraction agents which escapes with the non-condensable gases. The process according to the invention consists in a washing operation of the escaping gases with the waste water which is to be extracted. Preferably the washing of the gases is carried out in a column. The extraction agents contained in the gases are dissolved in the waste water while carbon dioxide, hydrogen sulfide etc., practically speaking, remain undissolved. Then the waste water is treated with the extracting agent in order to extract for instance the phenolic compounds.

The present process may be illustrated by referring to the annexed drawing.

Waste water of a low temperature carbonization plant which has been extracted with butyl acetate for removing phenolic compounds and which was preheated to the temperature of 80° C. is introduced into the column K through the pipe A. Carbon dioxide, hydrogen sulfide and other possible gases are separated from the water flowing down in the column K by the steam entering the column in D. At the same time the total quantity of the extraction agent dissolved distills over with water in the form of an azeotropic mixture. The gases leave the column in U. The azeotropic mixture is condensed in the condenser C while the non-condensable gases, which carry away a certain part of the extraction agent in form of gas, leave the column in E and are conveyed to the washer W where they are washed with the waste water which has not been extracted. The gases remaining undissolved leave the washer in G. They consist mainly of carbon dioxide and hydrogen sulfide. The waste water which has absorbed the extraction agent runs out in L and is then conveyed to the extraction plant. The waste water is conveyed to the washer W by the pipe Z.

The water which contains the total quantity of ammonia in free form flows down in the column and runs out through the siphon S in B. It may be worked up to ammonia. The distilled water and the solvent are collected in the separator P from where the solvent runs out in F. The water distilled over runs out in N and may be united with the extracted waste water which is introduced in the column in A in order to avoid any loss of solvent.

I claim:

1. Process for recovery of extraction solvent for phenolic compounds which comprises continuously introducing near the top of a rectifying column phenolic waste water from coking and gasifying plants containing the extraction phenolic solvent, carbon dioxide and ammonia introducing steam countercurrent thereto, whereby the incoming waste water retains ammonia and allows a vapor mixture containing carbon dioxide, water and the extraction solvent to pass to the top of the column, withdrawing the water containing ammonia at the bottom of the rectifying column, condensing the vapors from the column, in a condenser and separating the extraction solvent from the water in the condensed vapors.

2. Process as claimed in claim 1 the step of preheating the extracted waste waters.

3. Process as claimed in claim 1 the step of preheating the extracted waste waters to a temperature which is 5 to 20° C. below the temperature maintained in the distilling vessel.

4. Process according to claim 1 the step of washing the uncondensable vapors from the condenser with phenolic waste water prior to extraction thereof by an extraction solvent.

5. Process according to claim 1 the step of preheating the incoming phenolic waste water to the temperature of 80° C.

ALFRED DIERICHS.

REFERENCES CITED

The following references are of record in the file of this patent:

UNITED STATES PATENTS

| Number | Name | Date |
| --- | --- | --- |
| 1,790,303 | Gosschin | Jan. 27, 1931 |
| 2,288,176 | Baehr | June 30, 1942 |
| 2,209,150 | Byrns | July 23, 1940 |
| 2,177,183 | Kraft et al | Oct. 24, 1939 |
| 2,168,570 | Kraft | Aug. 8, 1939 |

OTHER REFERENCES

"Design and Workings of Ammonia Stills" by Parrish, 1924 Edition by D. Van Nostrand Co., New York, pages 65 and 66.